United States Patent
Dooka et al.

(10) Patent No.: US 7,874,068 B2
(45) Date of Patent: Jan. 25, 2011

(54) PRODUCTION METHOD FOR ELECTRONIC CHIP COMPONENT

(75) Inventors: Minoru Dooka, Echizen (JP); Kazunori Kunimoto, Echizen (JP); Katsunori Ogata, Sabae (JP); Naohiro Yamada, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/631,966

(22) Filed: Dec. 7, 2009

(65) Prior Publication Data

US 2010/0146778 A1   Jun. 17, 2010

(30) Foreign Application Priority Data

Dec. 12, 2008  (JP) ............................. 2008-316329

(51) Int. Cl.
H05K 3/30   (2006.01)
(52) U.S. Cl. ............................. 29/836; 29/832; 29/834; 257/623
(58) Field of Classification Search ............... 29/832, 29/834, 836; 257/623
See application file for complete search history.

(56) References Cited

U.S. PATENT DOCUMENTS

| 7,667,299 | B2 * | 2/2010 | Mori et al. .................. 257/623 |
| 2007/0227649 | A1 | 10/2007 | Onodera et al. |

FOREIGN PATENT DOCUMENTS

| GB | 2 254 272 A | 10/1992 |
| JP | 4-291712 A | 10/1992 |
| JP | 2000-299145 A | 10/2000 |
| JP | 2006-190864 A | 7/2006 |
| JP | 2007-266208 A | 10/2007 |

* cited by examiner

Primary Examiner—C. J Arbes
(74) Attorney, Agent, or Firm—Keating & Bennett, LLP

(57) ABSTRACT

A production method for an electronic chip component includes the steps of forming a first paste layer by applying paste onto a first end surface of an electronic component body with a second end surface being stuck onto a substrate having an adhesive surface and drying the paste, turning the electronic component body 180 degrees so as to stick the first end surface of the electronic component body onto the substrate by sliding a slider relative to the substrate in a state in which the slider is in contact with the first end surface of the electronic component body, forming a second paste layer by applying the paste onto the second end surface of the electronic component body and drying the paste, and firing the first and second paste layers.

10 Claims, 15 Drawing Sheets

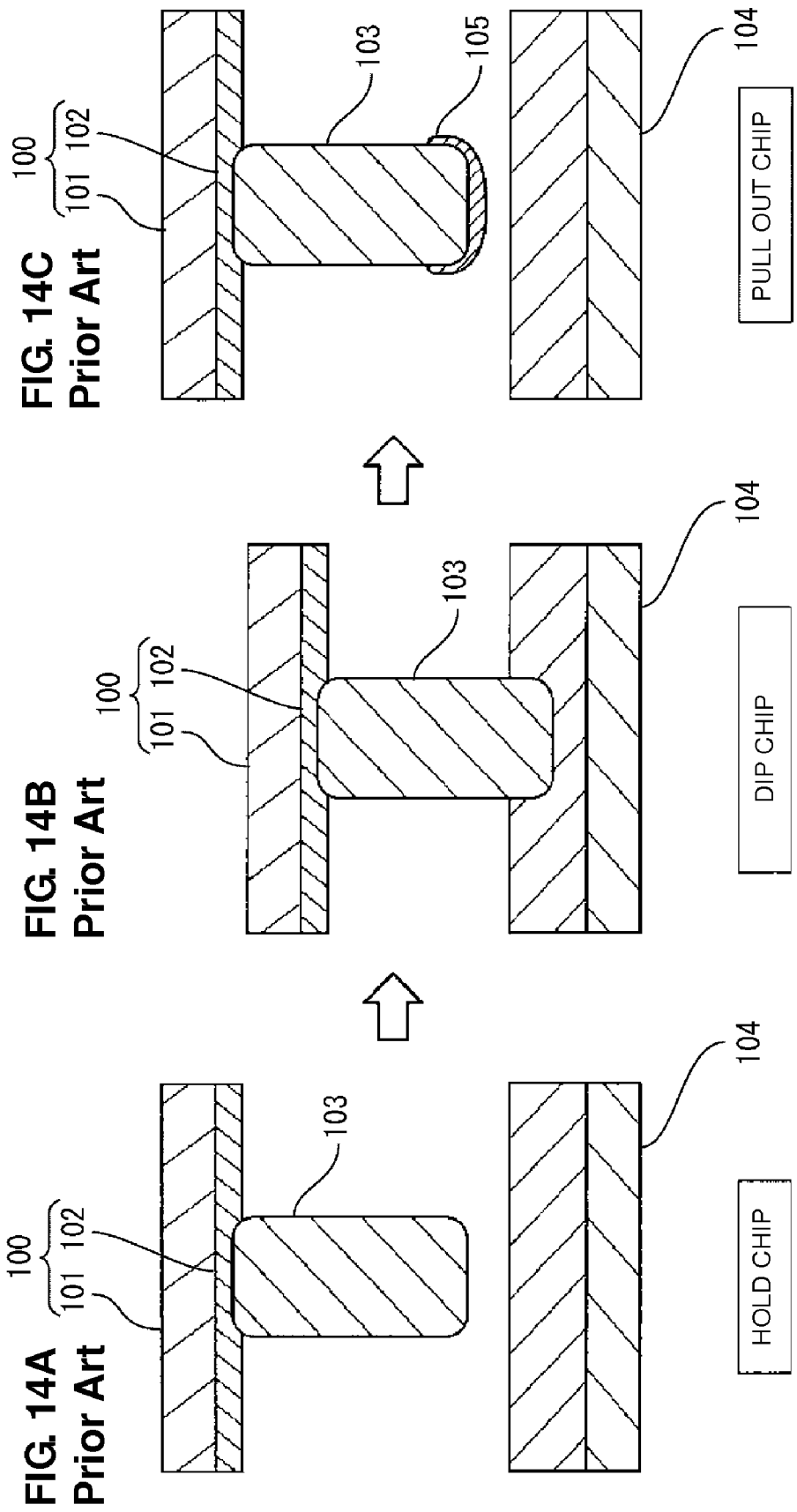

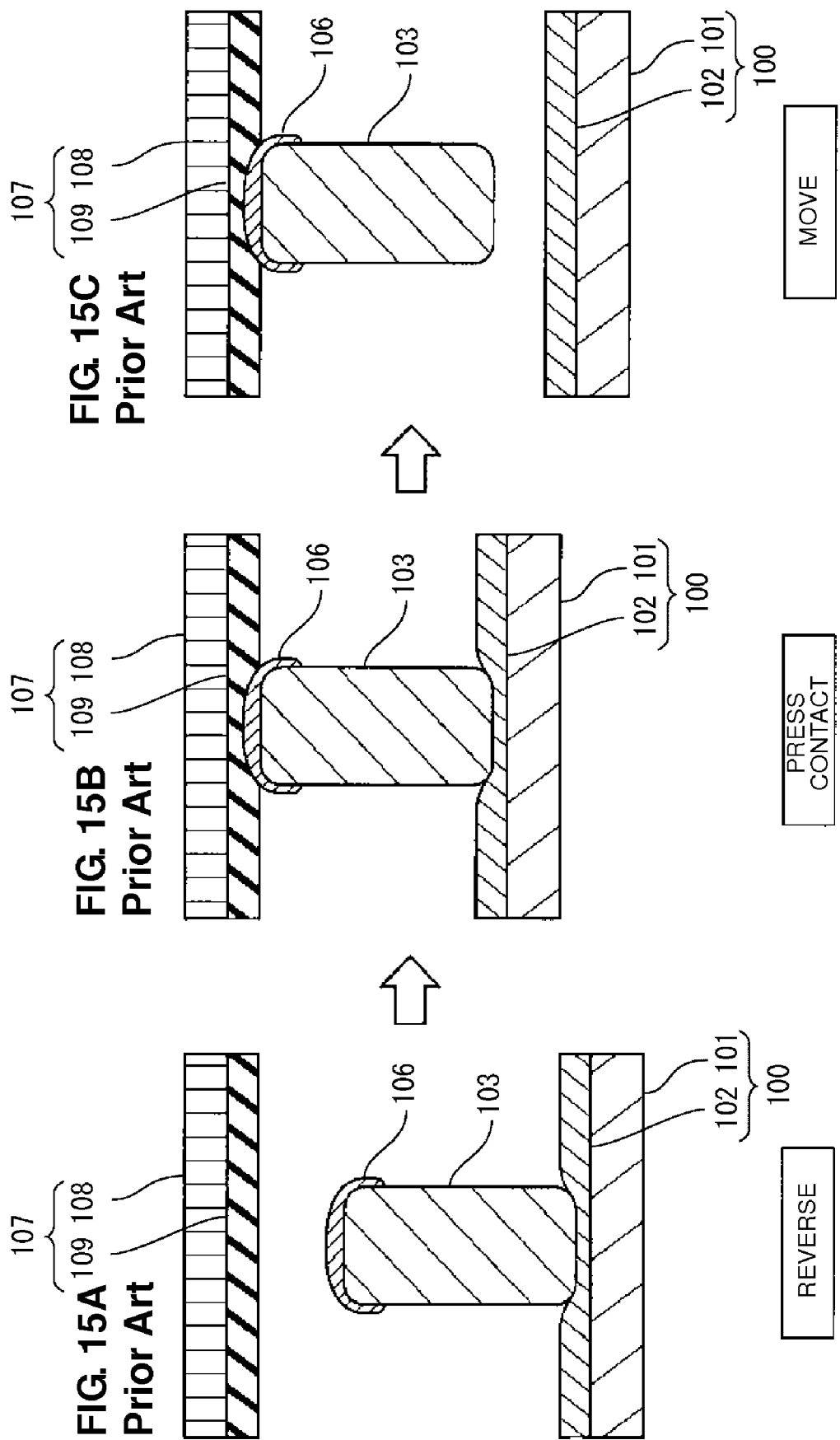

PRODUCTION METHOD FOR ELECTRONIC CHIP COMPONENT

BACKGROUND OF THE INVENTION

1. Field of the Invention

The present invention relates to a production method for an electronic chip component, and more particularly, to a production method for an electronic chip component in which a functional member, such as an external electrode, formed of paste, is provided on each end surface of a component body.

2. Description of the Related Art

In recent years, multiple electronic chip components have been used in various electronic devices. A specific example of an electronic chip component is a monolithic ceramic capacitor. In general, a monolithic ceramic capacitor includes a ceramic body having a substantially rectangular parallelepiped shape and incorporating first and second internal electrodes that oppose each other, and first and second external electrodes provided on end surfaces of the ceramic body.

In such a monolithic ceramic capacitor, the first and second external electrodes are formed by applying a conductive paste onto the end surfaces of the ceramic body and firing the conductive paste. For example, Japanese Unexamined Patent Application Publication No. 2007-266208 discloses the following method as a method for forming the first and second external electrodes.

First, as shown in FIG. 14A, one end surface of a ceramic body 103 is stuck to a plate 100 including a base plate 101 formed of stainless steel and an adhesive silicon rubber 102. Next, as shown in FIG. 14B, the other end surface of the ceramic body 103 is pressed against an application head 104, thereby forming a conductive paste layer 105 on the other end surface of the ceramic body 103, as shown in FIG. 14C. The conductive paste layer 105 is then fired to form a first external electrode 106 shown in FIG. 15A.

Next, as shown in FIG. 15B, the first external electrode 106 is pressed against a sheet 107 formed by a PET film 108 coated with a foamable and releasable adhesive 109. The adhesive force of the foamable and releasable adhesive 109 is higher than that of the silicon rubber 102. Thus, as shown in FIG. 15C, the ceramic body 103 is released from the plate 100 and is stuck to the sheet 107. By forming a conductive paste layer on the one end surface of the ceramic body 103 and firing the conductive paste layer in this state, a second external electrode is formed.

This publication describes that the above-described method can produce electronic chip components with a high working efficiency and a high production yield.

However, in the production method for the electronic chip component described in the publication, a plurality of holding jigs, namely, the plate 100 and the sheet 107, are necessary. Moreover, the relatively weak adhesive force of the silicon rubber 102 decreases with time, and the ceramic body 103 may thereby fall off the plate 100. In addition, when the ceramic body 103 is delivered between the different holding jigs, it may fall off or may be left on the plate 100. Hence, it is difficult to achieve a sufficiently high production yield.

SUMMARY OF THE INVENTION

Accordingly, preferred embodiments of the present invention provide a production method for an electronic chip component that can easily produce electronic chip components with a high production yield.

According to a preferred embodiment of the present invention, a production method for an electronic chip component including an electronic component body having a substantially rectangular parallelepiped shape and first and second functional members formed of paste is provided. The electronic component body includes first and second main surfaces, first and second side surfaces perpendicular or substantially perpendicular to the first and second main surfaces, and first and second end surfaces perpendicular or substantially perpendicular to the first and second main surfaces and the first and second side surfaces. The first and second functional members are respectively provided on the first and second end surfaces of the electronic component body.

The production method according to a preferred embodiment of the present invention includes a sticking step of sticking the second end surface of the electronic component body onto a substrate having an adhesive surface, a step of forming a first paste layer by applying the paste onto the first end surface of the electronic component body stuck to the substrate and drying the paste, a step of turning the electronic component body 180 degrees so as to stick the first end surface of the electronic component body with the first paste layer onto the substrate by sliding a slider relative to the substrate in a state in which the slider is in contact with the first end surface of the electronic component body, a step of forming a second paste layer by applying the paste onto the second end surface of the electronic component body and drying the paste, and a step of forming the first and second functional members by firing the first and second paste layers.

The sticking step may include the steps of sticking the first main surface of the electronic component body onto the surface of the substrate, and turning the electronic component body 90 degrees so as to stick the second end surface of the electronic component body onto the substrate by sliding the slider relative to the substrate in a state in which the slider is in contact with the second main surface of the electronic component body.

Preferably, the paste is a ceramic paste, for example.

Preferably, the paste is a conductive paste, and the first and second functional members are first and second external electrodes. In this case, it is possible to easily produce electronic ceramic chip components with a high production yield.

Preferably, the electronic component body is a ceramic body in which a first internal electrode connected to the first external electrode and a second internal electrode connected to the second external electrode face each other.

Preferably, a surface of the slider facing the first end surface has elasticity. This structure allows the electronic component body to be easily turned with high reliability. Further, this structure can effectively prevent the electronic component body from being damaged by contact with the slider.

Preferably, the slider includes a support member and an elastic member stuck onto a surface of the support member. This structure allows the surface of the slider to be kept flat. It is therefore possible to easily turn the electronic component body with high reliability. In addition, handlability of the slider can be improved.

Preferably, the support member is formed by a metal plate, for example.

Preferably, a surface of the slider facing the first end surface has irregularities. This structure allows the electronic component body to be easily turned with high reliability.

In the production method for the electronic chip component according to a preferred embodiment of the present invention, the electronic component body is turned by sliding the slider relative to the substrate in a state in which the slider is in contact with the first end surface of the electronic component body, thereby exposing the second end surface. Since it is unnecessary to use a plurality of holding jigs and to deliver the electronic component body between the different holding jigs, the electronic component body can be effectively prevented from falling off. This allows electronic chip components to be easily produced with high production yield.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 14A to 14C are schematic sectional views illustrating steps of producing an electronic chip component in the related art.

FIGS. 15A to 15C are schematic sectional views illustrating steps of producing the electronic chip component in the related art.

DETAILED DESCRIPTION OF THE PREFERRED EMBODIMENTS

Figure 1:
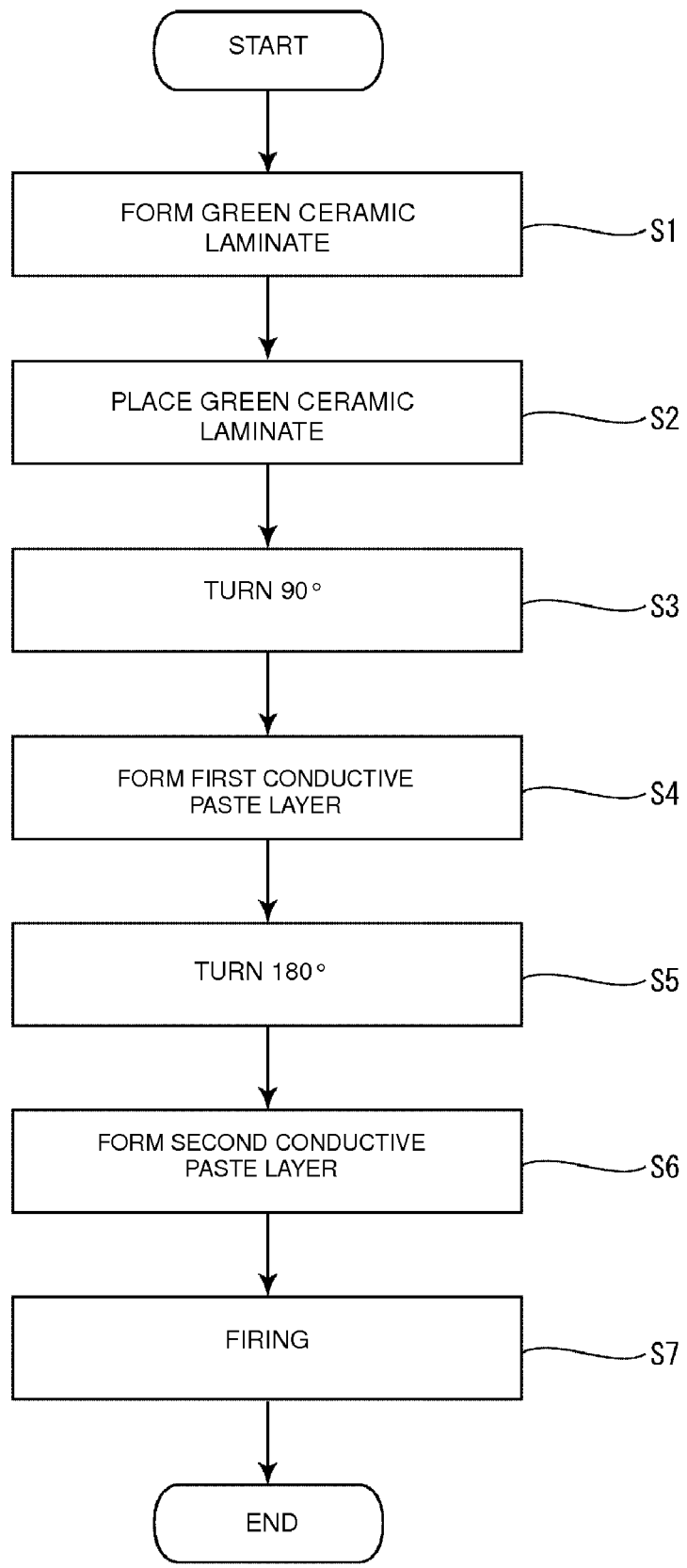
FIG. 1 is a flowchart showing a production procedure for a ceramic electronic component.

The present invention will be clearly explained below by describing preferred embodiments thereof with reference to the drawings.

In a preferred embodiment of the present invention, a production method for a ceramic electronic component serving as an electronic chip component will be described as an example.

First, a ceramic electronic component 1 to be produced in the present preferred embodiment will be described with reference to FIGS. 11 to 13.

For example, the ceramic electronic component 1 defines a ceramic capacitor device, a ceramic piezoelectric device, thermistor device, or an inductor device. Referring to FIGS. 11 to 13, the ceramic electronic component 1 includes a ceramic body 10 preferably having a substantially rectangular parallelepiped shape. More specifically, the ceramic body 10 preferably has a substantially rectangular parallelepiped shape including chamfered corner and edge portions. The ceramic body 10 includes first and second main surfaces 10a and 10b, first and second side surfaces 10c and 10d, and first and second end surfaces 10e and 10f. The first and second side surfaces 10c and 10d are perpendicular or substantially perpendicular to the first and second main surfaces 10a and 10b. The first and second end surfaces 10e and 10f are perpendicular or substantially perpendicular to the first and second main surfaces 10a and 10b and the first and second side surfaces 10c and 10d.

The size of the ceramic body 10 is not limited particularly.

The ceramic body 10 is formed of an appropriate ceramic material. The ceramic material that forms the ceramic body 10 is appropriately selected in accordance with the characteristics of the ceramic electronic component 1. For example, when the ceramic electronic component 1 is a ceramic capacitor device, the ceramic body 10 can be formed of a material mainly containing a dielectric ceramic material. Examples of dielectric ceramic materials are $BaTiO_3$, $CaTiO_3$, $SrTiO_3$, and $CaZrO_3$, for example. Accessory ingredients, such as a Mn compound, a Fe compound, a Cr compound, a Co compound, and a Ni compound, may be appropriately added to the ceramic body 10.

When the ceramic electronic component is a ceramic piezoelectric device, the ceramic body 10 can be formed of a material mainly containing a piezoelectric ceramic material. A specific example of a piezoelectric ceramic material is a PZT (lead zirconate titanate) ceramic material.

When the ceramic electronic component 1 is a thermistor device, the ceramic body 10 can be formed of a material mainly containing a semiconductor ceramic material. A specific example of a semiconductor ceramic material is a spinel ceramic material.

When the ceramic electronic component 1 is an inductor device, the ceramic body 10 can be formed of a material mainly containing a magnetic ceramic material. A specific example of a magnetic ceramic material is a ferrite ceramic material.

For example, the ceramic body 10 may be formed by a plurality of stacked ceramic layers, or may be formed by an integral ceramic body. The structure of the ceramic body 10 can be appropriately selected, for example, in accordance with the production method for the ceramic body 10.

Figure 12:
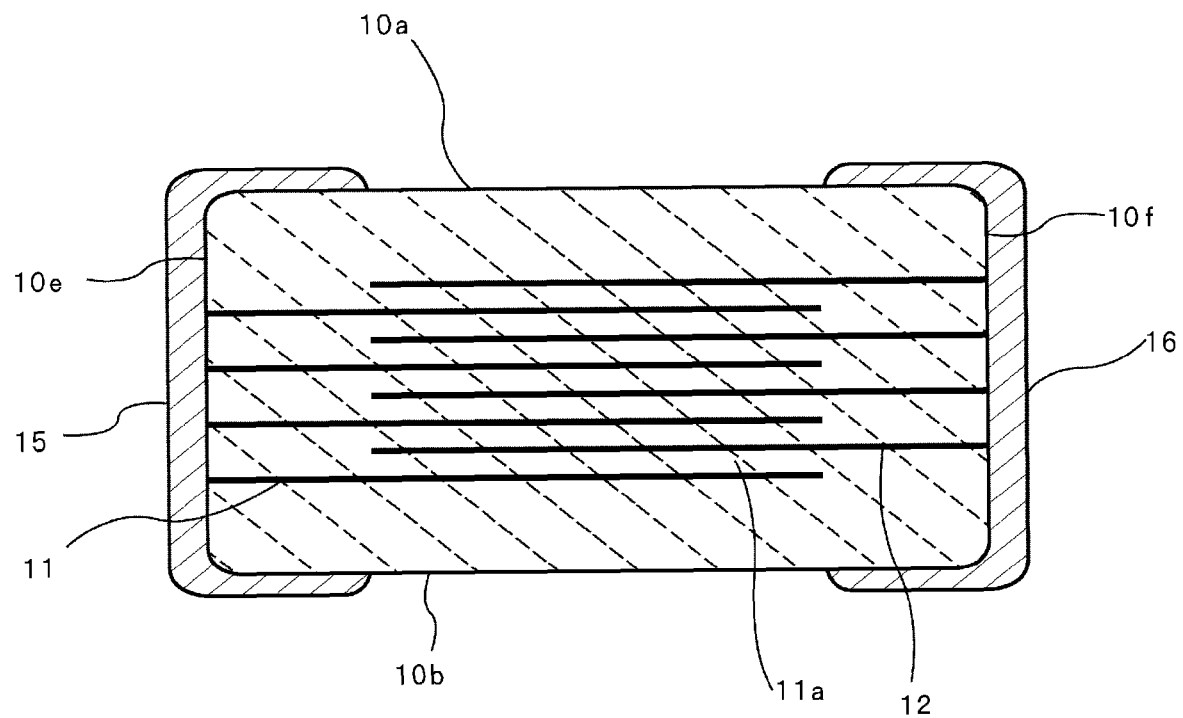
FIG. 12 is a cross-sectional view taken along line XI-XI of FIG. 11.
Figure 13:
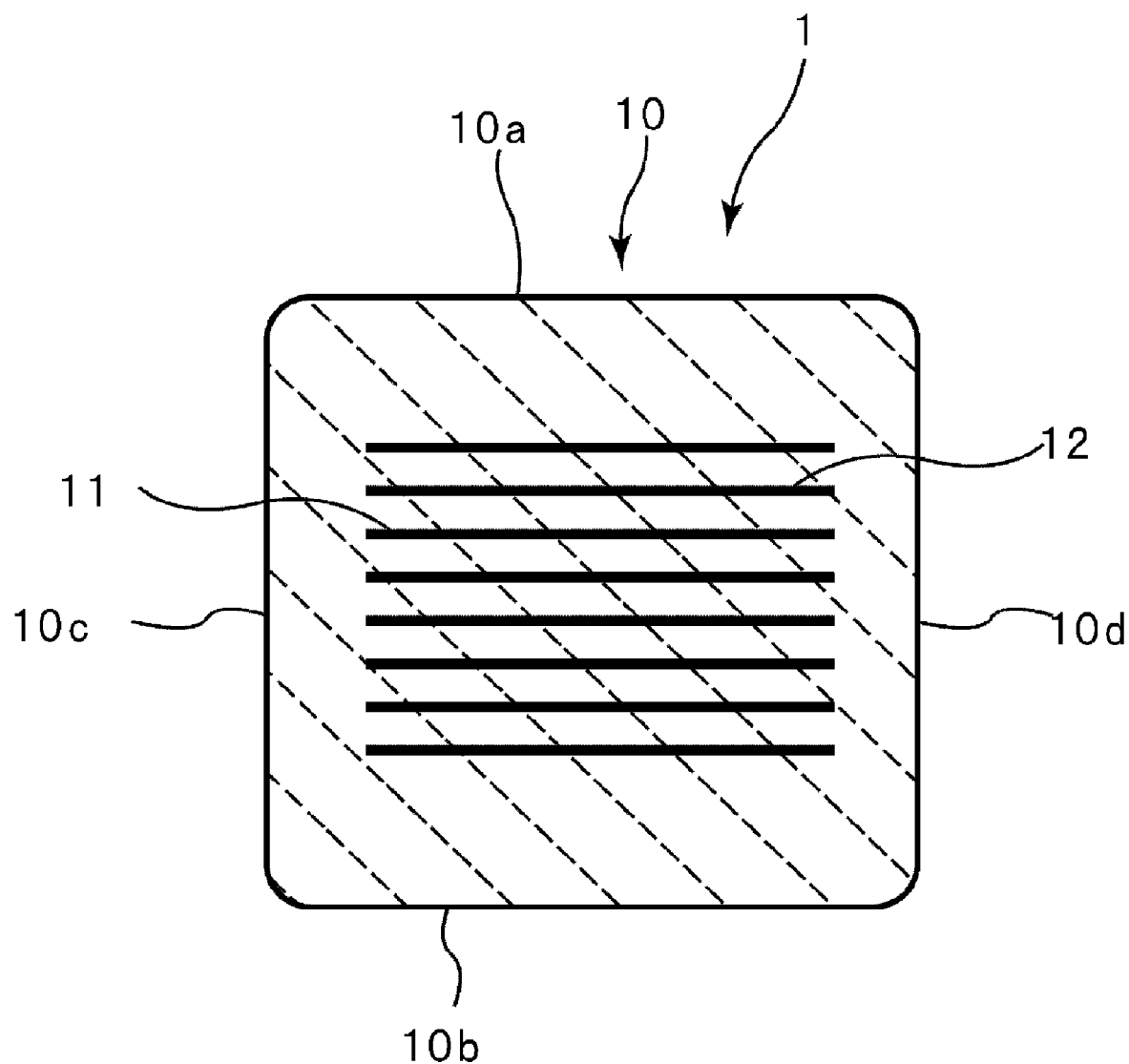
FIG. 13 is a cross-sectional view taken along line XII-XII of FIG. 11.

As shown in FIGS. 12 and 13, a plurality of first internal electrodes 11 and a plurality of second internal electrodes 12 are provided in the ceramic body 10. The first and second internal electrodes 11 and 12 are alternately arranged to be spaced apart from each other. In other words, the first and second internal electrodes 11 and 12 are arranged such that portions of the adjacent first and second internal electrodes 11 and 12 face each other with the ceramic layer being disposed therebetween.

The first and second internal electrodes 11 and 12 can be formed of an appropriate conductive material. More specifically, for example, the first and second internal electrodes 11 and 12 can be formed of metal such as Ni, Cu, Ag, Pd, or Au, or an alloy containing at least one of these metals, for example, an alloy of Ag and Pd, for example.

Figure 11:
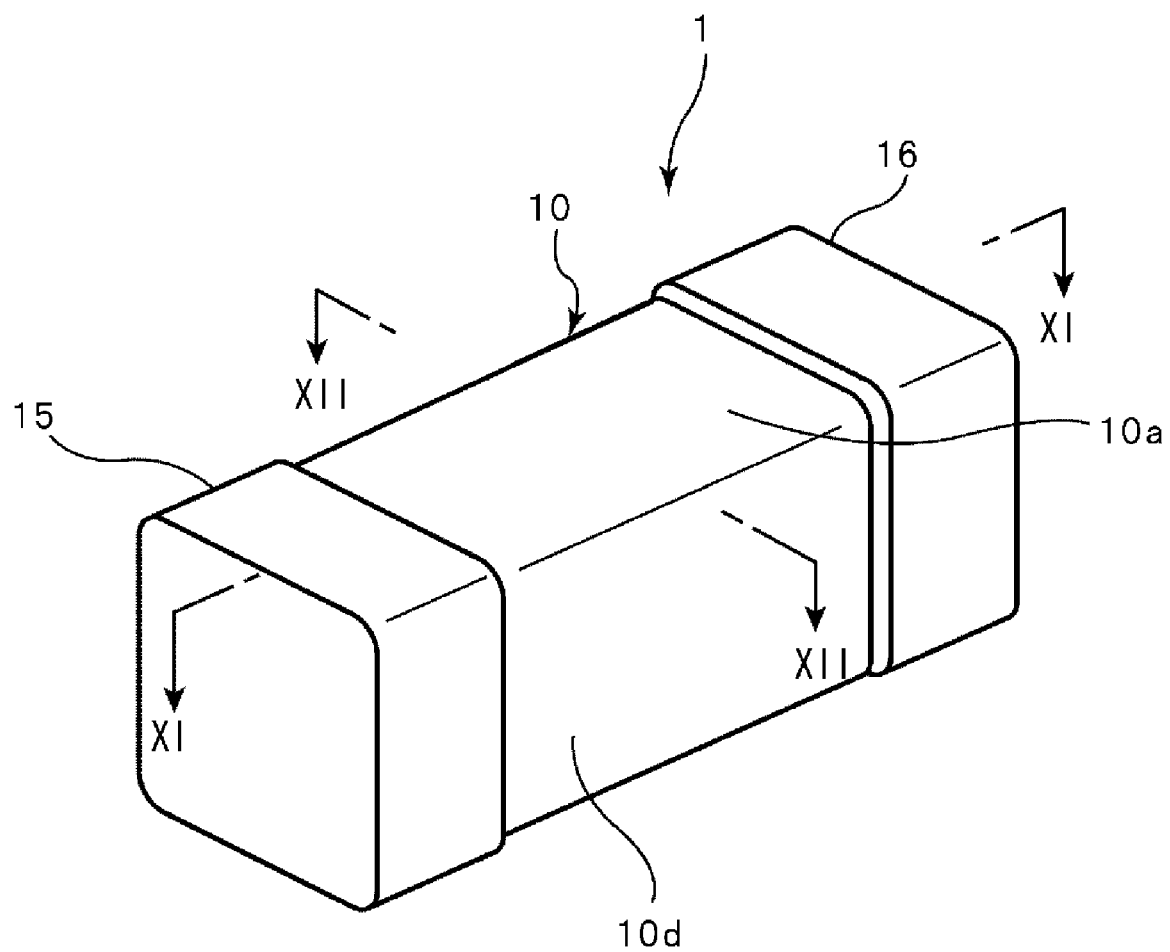
FIG. 11 is a schematic perspective view of an electronic chip component.

As shown in FIG. 11, a first external electrode 15 connected to the first internal electrodes 11 is provided on the first end surface 10e of the ceramic body 10. Further, a second external electrode 16 connected to the second internal electrodes 12 is provided on the second end surface 10f of the ceramic body 10.

The first and second external electrodes 15 and 16 can be formed of an appropriate conductive material. For example, the first and second external electrodes 15 and 16 can be formed of metal such as Ni, Cu, Ag, Pd, or Au, or an alloy containing at least one of these metals, for example, an alloy of Ag and Pd, for example.

In the present preferred embodiment, the first and second external electrodes 15 and 16 are formed of a conductive paste containing the above-described conductive material.

Next, a production method for the ceramic electronic component 1 will be described.

Referring to FIG. 1, first, a green ceramic laminate is formed in Step S1. More specifically, a conductive paste for forming internal electrodes is printed in a predetermined pattern on a ceramic green sheet by screen printing or by other methods, thereby forming an internal electrode pattern. Next, the ceramic green sheet on which the internal electrode pattern is formed and a ceramic green sheet on which an internal electrode pattern is not formed are stacked to form a mother laminate. Then, the mother laminate is cut into green ceramic laminates 30 shown in FIG. 2. In a later firing step, ceramic bodies 10 are formed from the green ceramic laminates 30. Further, first and second internal electrodes 11 and 12 are formed from the internal electrode pattern. In the present preferred embodiment, an electronic component body is a general term of a green ceramic laminate 30 and a ceramic body 10.

Figure 2:
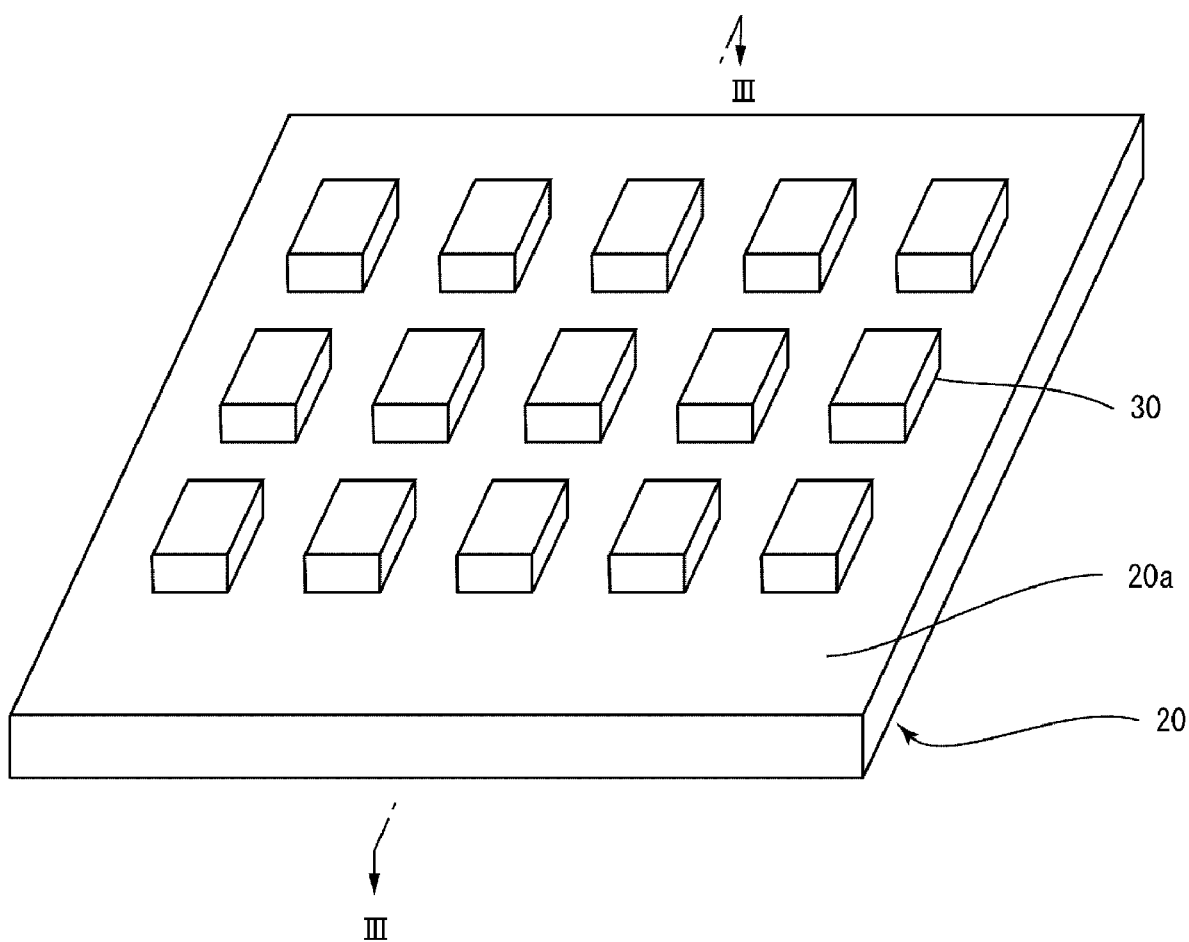
FIG. 2 is a schematic perspective view showing a step of placing green ceramic laminates on a substrate.
Figure 3:
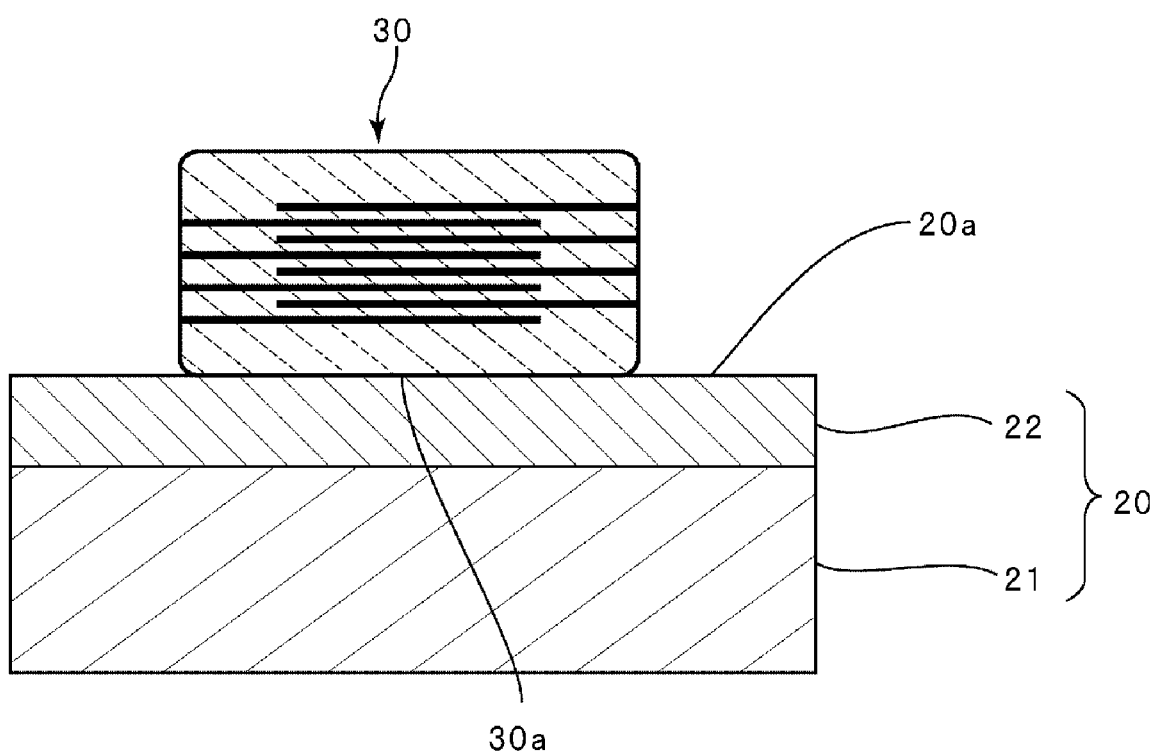
FIG. 3 is a cross-sectional view taken along line III-III of FIG. 2.

Next, in Step S2, a plurality of green ceramic laminates 30 are placed on a surface 20*a* of a substrate 20, as shown in FIGS. 2 and 3. The surface 20*a* of the substrate 20 has an adhesive force. More specifically, as shown in FIG. 3, the substrate 20 includes a substrate body 21, and an adhesive elastic layer 22 provided on a surface of the substrate body 21. In Step S2, a first main surface 30*a* of the ceramic laminate 30 is stuck onto the adhesive elastic layer 22.

Figure 4:
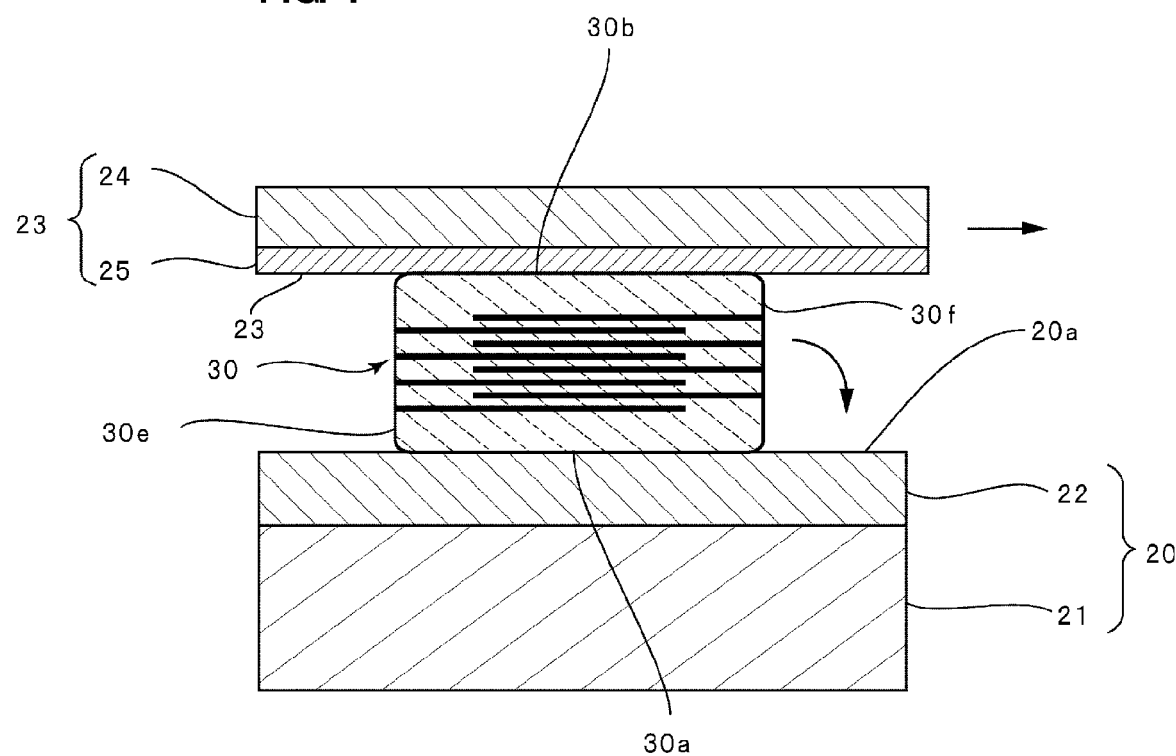
FIG. 4 is a schematic sectional view illustrating a step of turning a green ceramic laminate 90 degrees.
Figure 5:
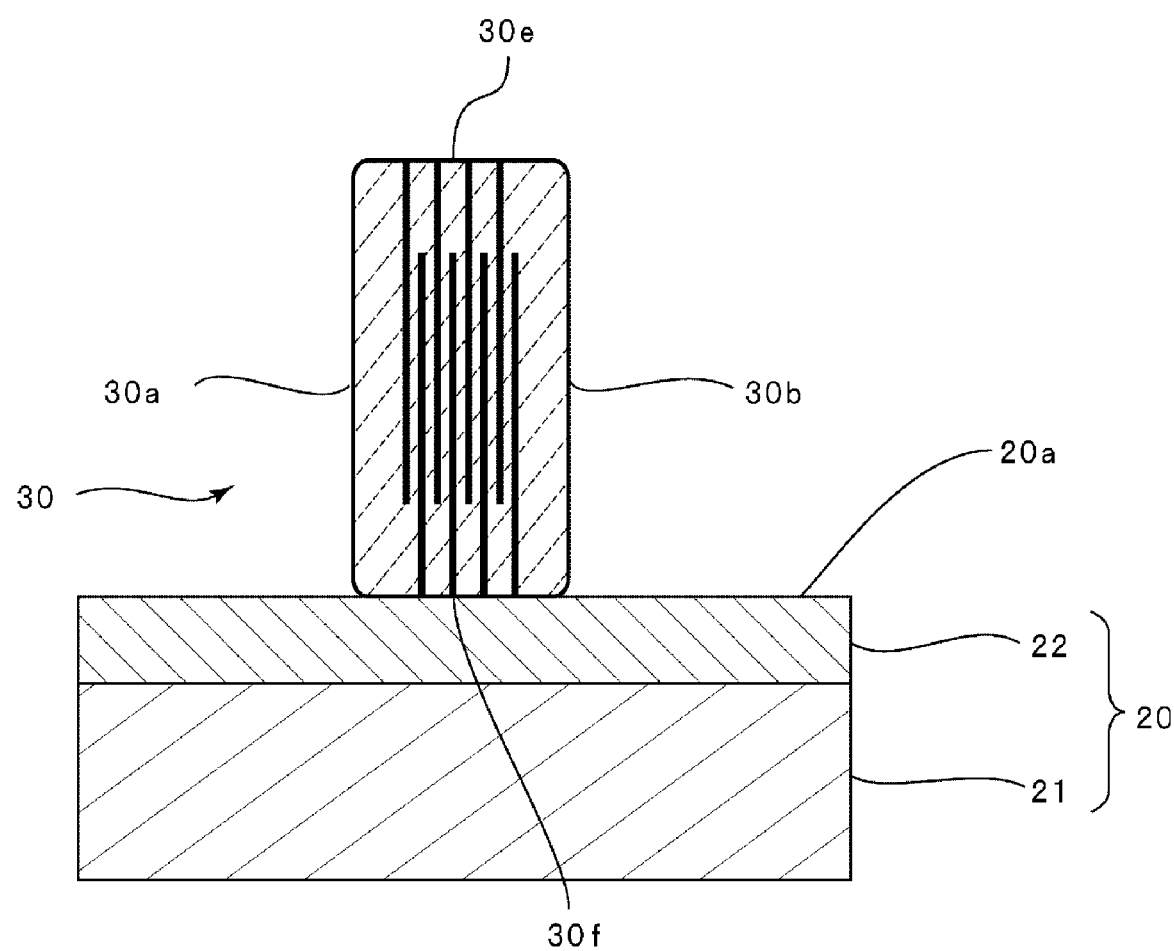
FIG. 5 is a schematic sectional view illustrating a step of turning the green ceramic laminate 90 degrees.

Next, in Step S3, the green ceramic laminate 30 is turned 90 degrees. More specifically, as shown in FIG. 4, a slider 23 is brought into pressing contact with a second main surface 30*b* of the green ceramic laminate 30. In this state, the slider 23 is slid relative to the substrate 20, whereby the green ceramic laminate 30 is turned 90 degrees. As a result, a second end surface 30*f* of the green ceramic laminate 30 is stuck onto the surface 20*a* of the substrate 20. In the present preferred embodiment, Steps S1 to S3 described above constitute a sticking step of sticking the second end surface 30*f* of the green ceramic laminate 30 onto the substrate 20.

In the present preferred embodiment, a surface 23*a* of the slider 23 facing the green ceramic laminate 30 has elasticity. More specifically, as shown in FIG. 4, the slider 23 includes a hard support member 24 formed by a metal plate, and an elastic member 25 stuck to the support member 24 and formed of rubber or resin. Since the elastic member 25 is located on the side of the surface 23*a* in this way, the green ceramic laminate 30 is effectively prevented from being damaged by contact with the slider 23. Further, since the support member 24 is provided, the surface 23*a* of the slider 23 facing the green ceramic laminate 30 can be kept flat. Moreover, handlability of the slider 23 is improved by the support member 24.

In this specification, the term "elastic member" refers to a member having rubber elasticity, that is, a member that has elasticity and is easy to elastically deform. The elastic member does not include metal.

The structure of the slider 23 is not particularly limited to the above-described structure. For example, the slider 23 may be formed by a film material having an adhesive layer on its surface.

In the present preferred embodiment, the surface 23*a* of the slider 23 facing the green ceramic laminate 30 has fine irregularities to increase the coefficient of friction thereof. This allows the green ceramic laminate 30 to be turned reliably. Of course, the surface 23*a* of the slider 23 does not always need to have irregularities.

The method of forming irregularities is not particularly limited. For example, irregularities may be physically formed by sand blasting or chemically formed by etching, for example. Alternatively, irregularities may be formed on the surface of the slider 23 by pouring a material of the slider 23, such as resin or rubber, into a mold having irregularities on its surface.

Figure 6:
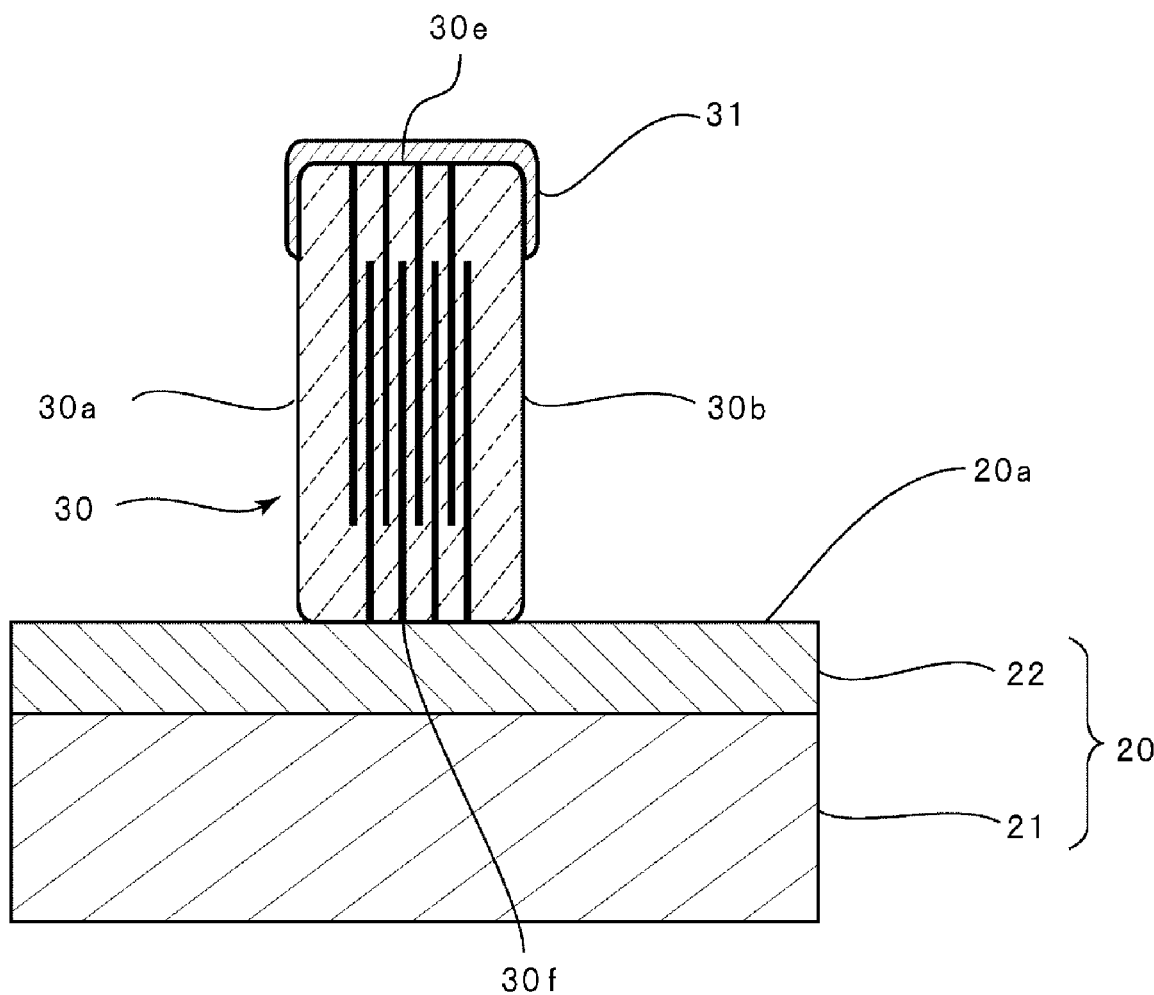
FIG. 6 is a schematic sectional view illustrating a step of forming a first conductive paste layer.

Next, in Step S4, as shown in FIG. 6, a conductive paste is applied onto a first end surface 30*e* of the green ceramic laminate 30, and is dried to form a first conductive paste layer 31. The method of applying the conductive paste is not particularly limited. For example, the conductive paste may be applied by dipping, screen printing, an inkjet method, a method of dripping conductive paste, or a method of sticking a sheet of conductive paste.

Figure 7:
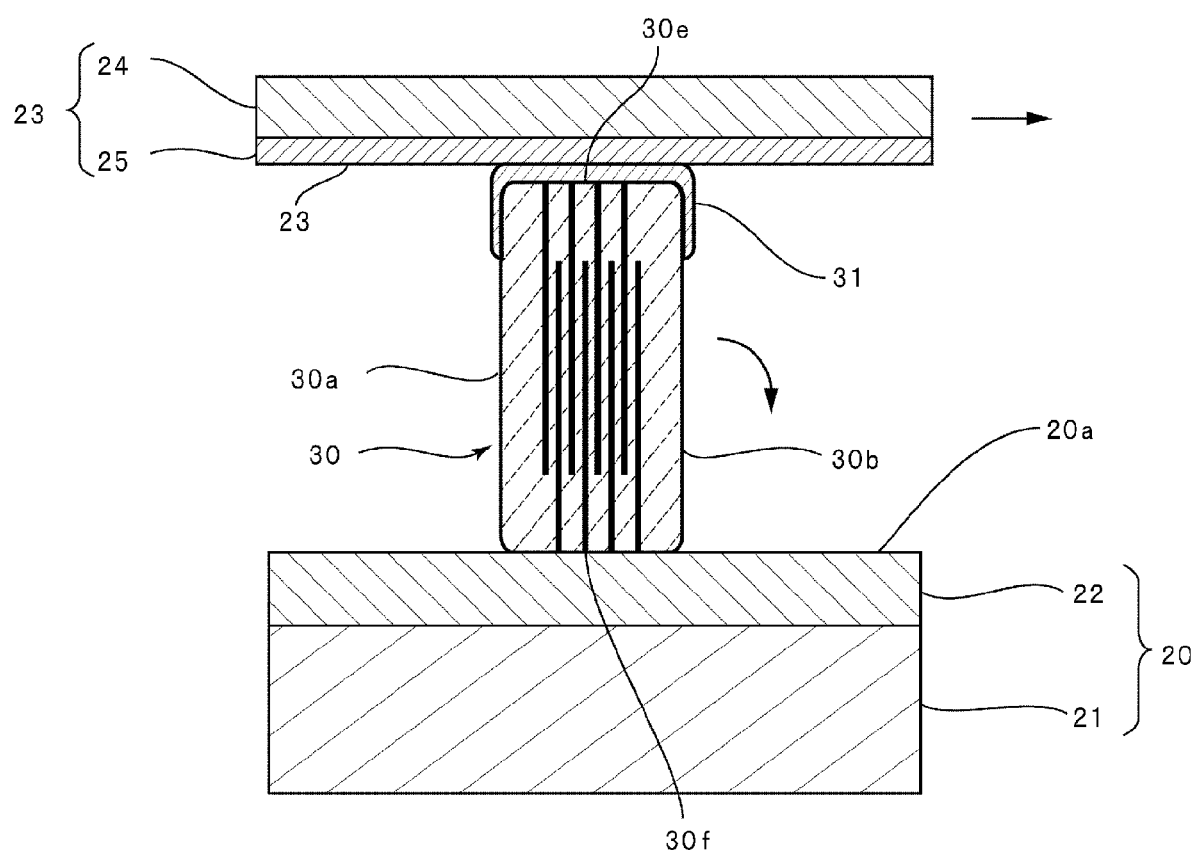
FIG. 7 is a schematic sectional view illustrating a step of turning the green ceramic laminate 180 degrees.
Figure 8:
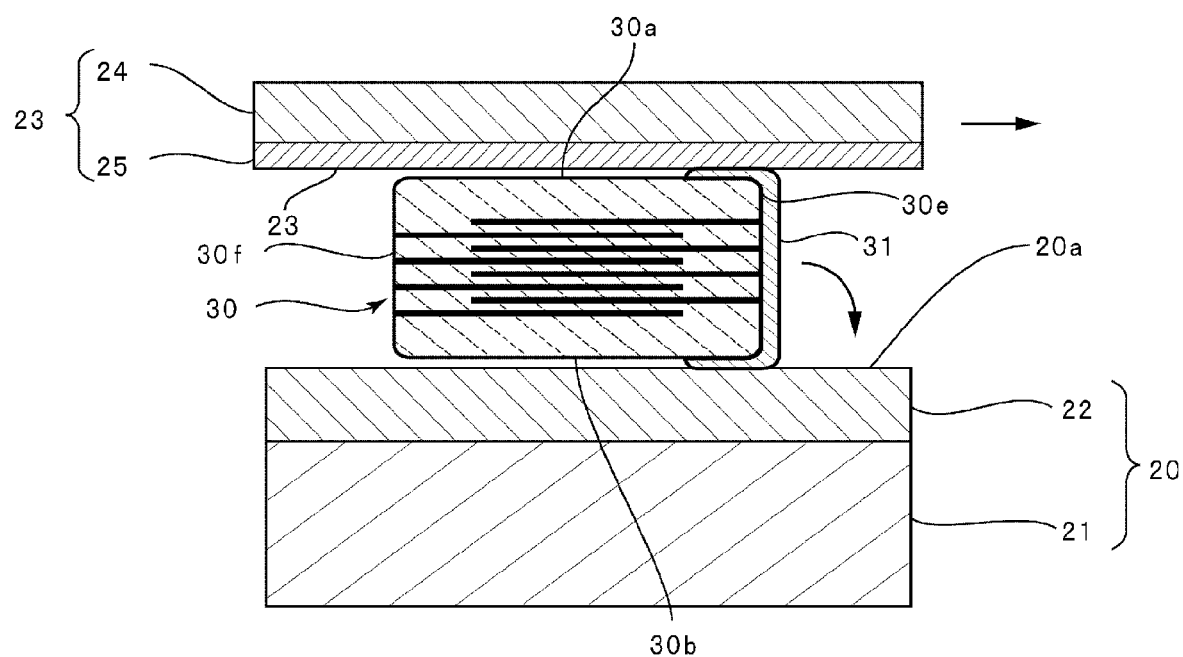
FIG. 8 is a schematic sectional view illustrating a step of turning the green ceramic laminate 180 degrees.
Figure 9:
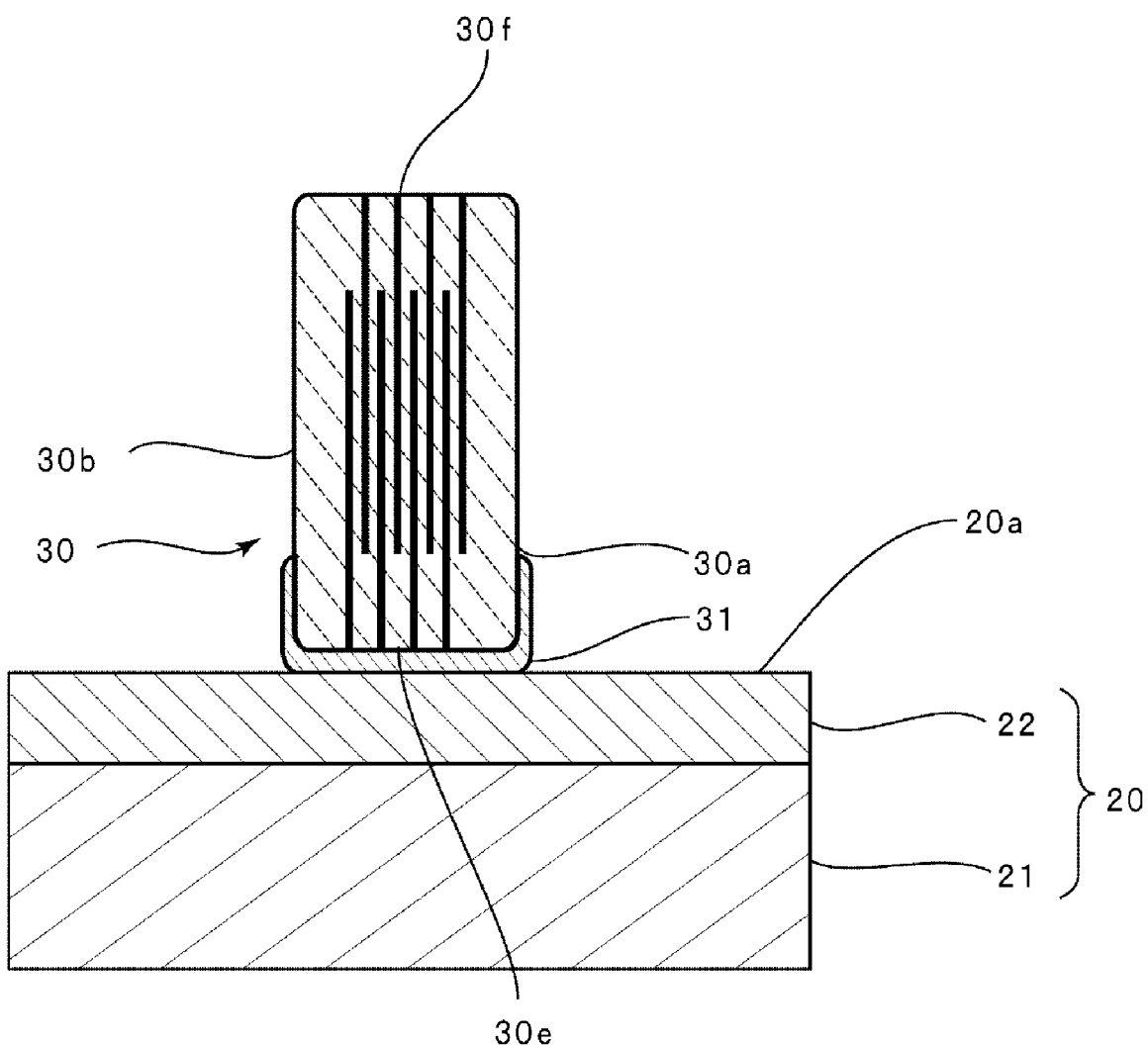
FIG. 9 is a schematic sectional view illustrating a step of turning the green ceramic laminate 180 degrees.

Next, in Step S5, as shown in FIGS. 7 to 9, the green ceramic laminate 30 is turned 180 degrees. Specifically, as shown in FIG. 7, the slider 23 is brought into pressing contact with the first end surface 30*e* of the green ceramic laminate 30. More specifically, the slider 23 is brought into pressing contact with the first conductive paste layer 31 provided on the first end surface 30*e*. In this state, the slider 23 is slid relative to the substrate 20, whereby the green ceramic laminate 30 is turned 180 degrees, as shown in FIGS. 8 and 9. As a result, the first conductive paste layer 31 on the first end surface 30*e* of the green ceramic laminate 30 is stuck onto the surface 20*a* of the substrate 20.

Figure 10:
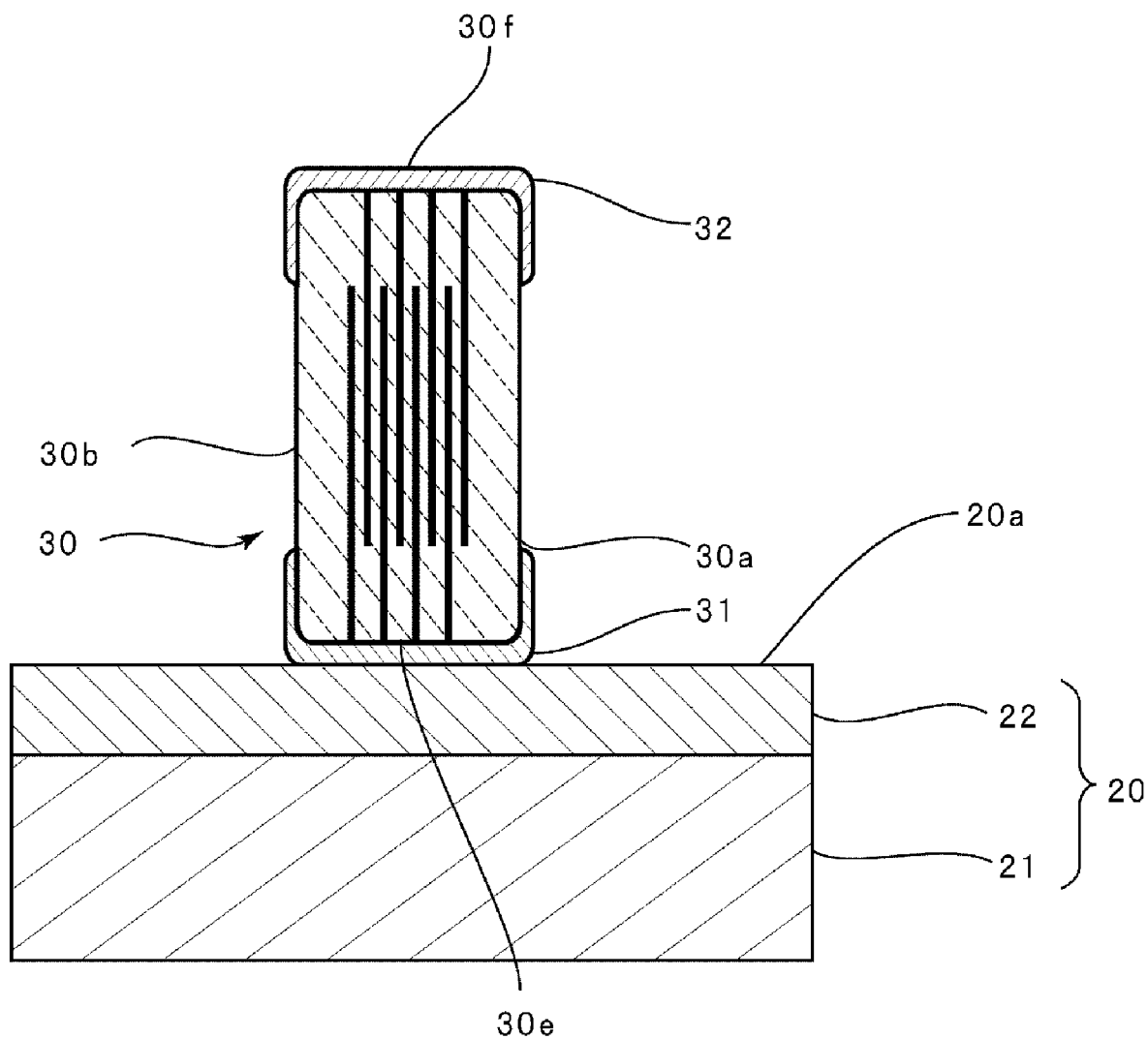
FIG. 10 is a schematic sectional view illustrating a step of forming a second conductive paste layer.

Next, in Step S6, as shown in FIG. 10, a conductive paste is applied onto the second end surface 30*f* of the green ceramic laminate 30, and is dried to form a second conductive paste layer 32. The method of applying the conductive paste is not particularly limited. For example, the conductive paste may be applied by dipping, screen printing, an inkjet method, a method of dripping conductive paste, or a method of sticking a sheet of conductive paste, for example.

Then, by firing the green ceramic laminate 30 and the first and second conductive paste layers 31 and 32 in Step S7, a ceramic electronic component 1 including the ceramic body 10, the first and second internal electrodes 11 and 12, and the first and second external electrodes 15 and 16 can be produced. The firing temperature can be appropriately set in accordance with the ceramic material and the conductive paste to be used.

As described above, the orientation of the green ceramic laminate 30 is changed by turning the green ceramic laminate 30 on the substrate 20 by the slider 23 in the present preferred embodiment. For this reason, the ceramic electronic component 1 can be produced without using a plurality of supporting jigs and without delivering the green ceramic laminate 30 between the supporting jigs. This effectively prevents the green ceramic laminate 30 from falling off. Moreover, a plurality of adhesives are unnecessary. Hence, it is unnecessary to manage the adhesive forces of a plurality of adhesives, and electronic chip components can be easily produced with a high production yield.

In the above-described preferred embodiment, the production method for the ceramic electronic component has been described as an example of a production method for an electronic chip component. However, the production method for the electronic chip component according to the present invention is not limited to the production method for the ceramic electronic component. The production method according to the present invention is also preferably applied to production of electronic chip components in each of which a functional member is provided on each end surface of an electronic component body, for example, to production of a multiterminal capacitor.

For example, the first and second functional members may be ceramic members, instead of the external electrodes. In this case, the first and second functional members are formed of ceramic paste.

While the green ceramic laminate 30 and the first and second conductive paste layers 31 and 32 are simultaneously fired in the preferred embodiment, the green ceramic laminate 30 may be first fired, and the first and second conductive paste layers 31 and 32 may be formed on the fired ceramic laminate 30.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A production method for an electronic chip component including an electronic component body including first and second functional members formed of paste, first and second main surfaces, first and second side surfaces arranged perpendicular or substantially perpendicular to the first and second main surfaces, and first and second end surfaces arranged perpendicular or substantially perpendicular to the first and second main surfaces and the first and second side surfaces, the first and second functional members being respectively provided on the first and second end surfaces of the electronic component body, the production method comprising:
   a sticking step of sticking the second end surface of the electronic component body onto a substrate having an adhesive surface;
   a step of forming a first paste layer by applying the paste onto the first end surface of the electronic component body stuck to the substrate and drying the paste;
   a step of turning the electronic component body 180 degrees so as to stick the first end surface of the electronic component body with the first paste layer onto the substrate by sliding a slider relative to the substrate in a state in which the slider is in contact with the first end surface of the electronic component body;
   a step of forming a second paste layer by applying the paste onto the second end surface of the electronic component body and drying the paste; and
   a step of forming the first and second functional members by firing the first and second paste layers.

2. The production method according to claim 1, wherein the sticking step includes the steps of:
   sticking the first main surface of the electronic component body onto the surface of the substrate; and
   turning the electronic component body 90 degrees so as to stick the second end surface of the electronic component body onto the substrate by sliding the slider relative to the substrate in a state in which the slider is in contact with the second main surface of the electronic component body.

3. The production method according to claim 1, wherein the paste is a ceramic paste.

4. The production method according to claim 1, wherein the paste is a conductive paste, and the first and second functional members are first and second external electrodes.

5. The production method according to claim 4, wherein the electronic component body is a ceramic body in which a first internal electrode connected to the first external electrode and a second internal electrode connected to the second external electrode face each other.

6. The production method according to claim 1, wherein a surface of the slider facing the first end surface has elasticity.

7. The production method according to claim 1, wherein the slider includes a support member and an elastic member stuck onto a surface of the support member.

8. The production method according to claim 7, wherein the support member is formed by a metal plate.

9. The production method according to claim 1, wherein a surface of the slider facing the first end surface has irregularities.

10. The production method according to claim 1, wherein the electronic component body has substantially rectangular parallelepiped shape.

* * * * *